May 5, 1953 E. W. HOLMES ET AL 2,637,448
WRECKER
Original Filed Dec. 28, 1944 6 Sheets-Sheet 1
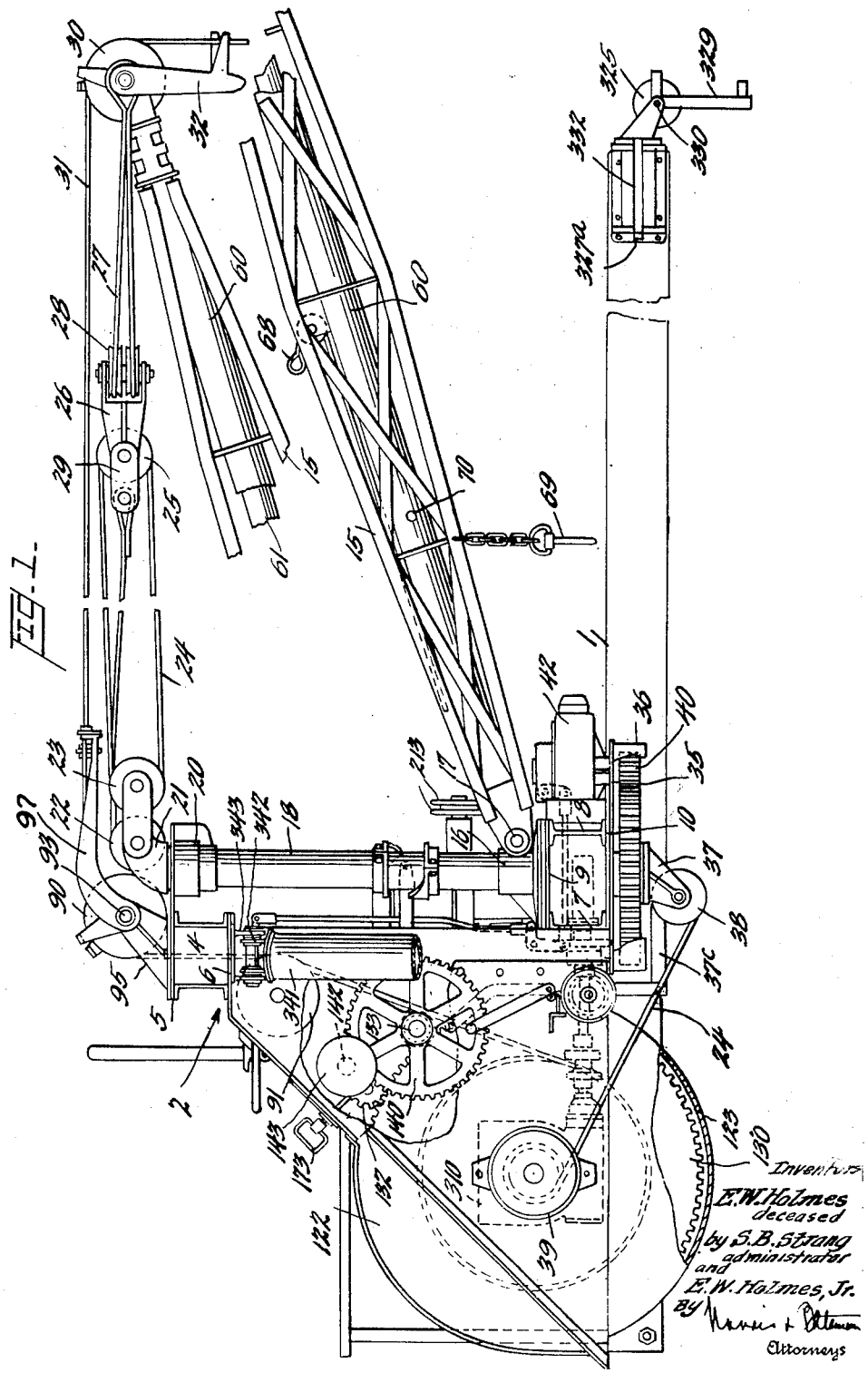
Inventors
E. W. Holmes
deceased
by S. B. Strang
administrator
and
E. W. Holmes, Jr.
By
Attorneys

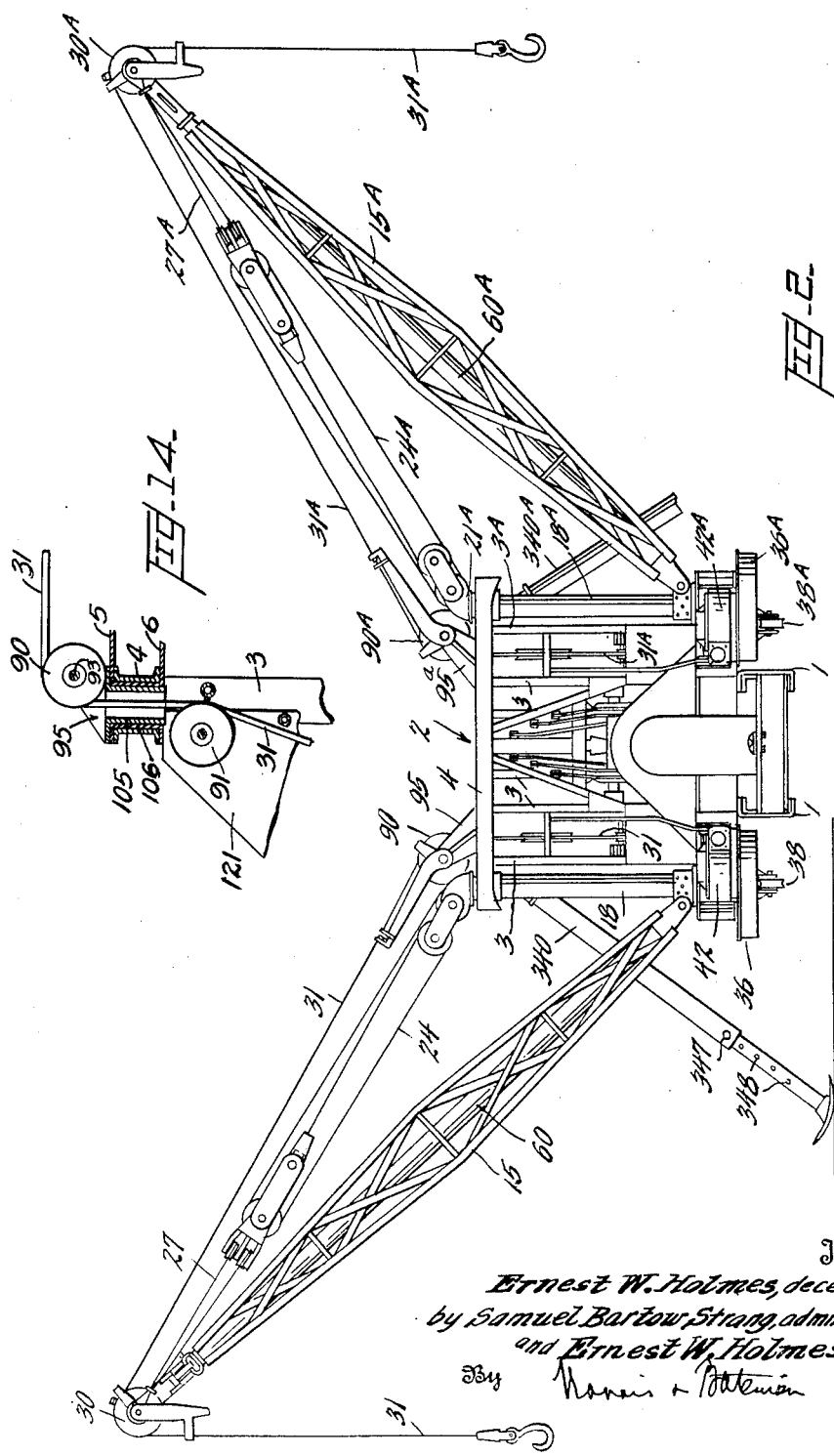

May 5, 1953 E. W. HOLMES ET AL 2,637,448
WRECKER
Original Filed Dec. 28, 1944 6 Sheets-Sheet 3
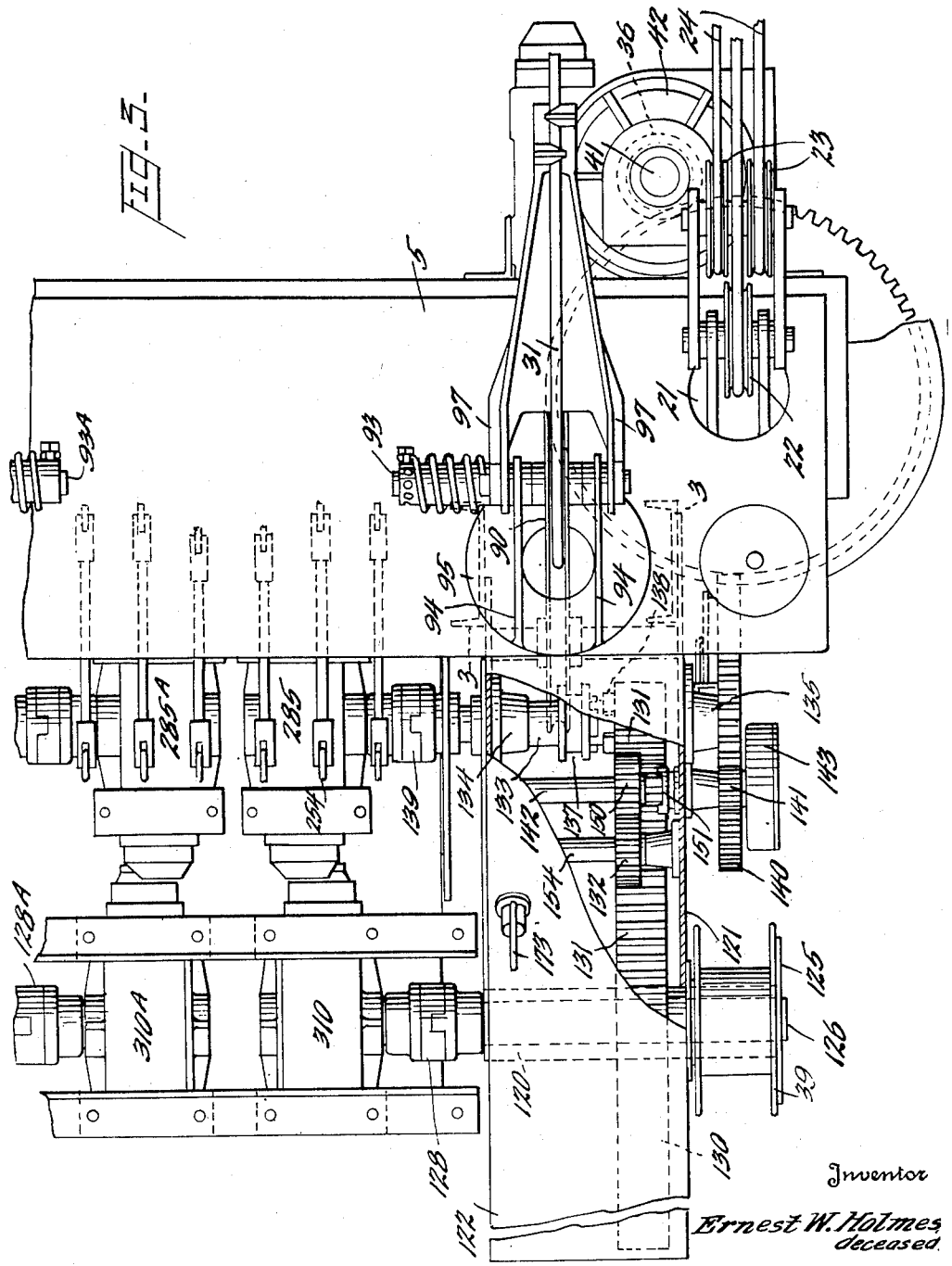
Inventor
Ernest W. Holmes,
deceased
by Samuel Bartow Strang, administrator
and Ernest W. Holmes, Jr.
By Marvin + Patterson
Attorneys

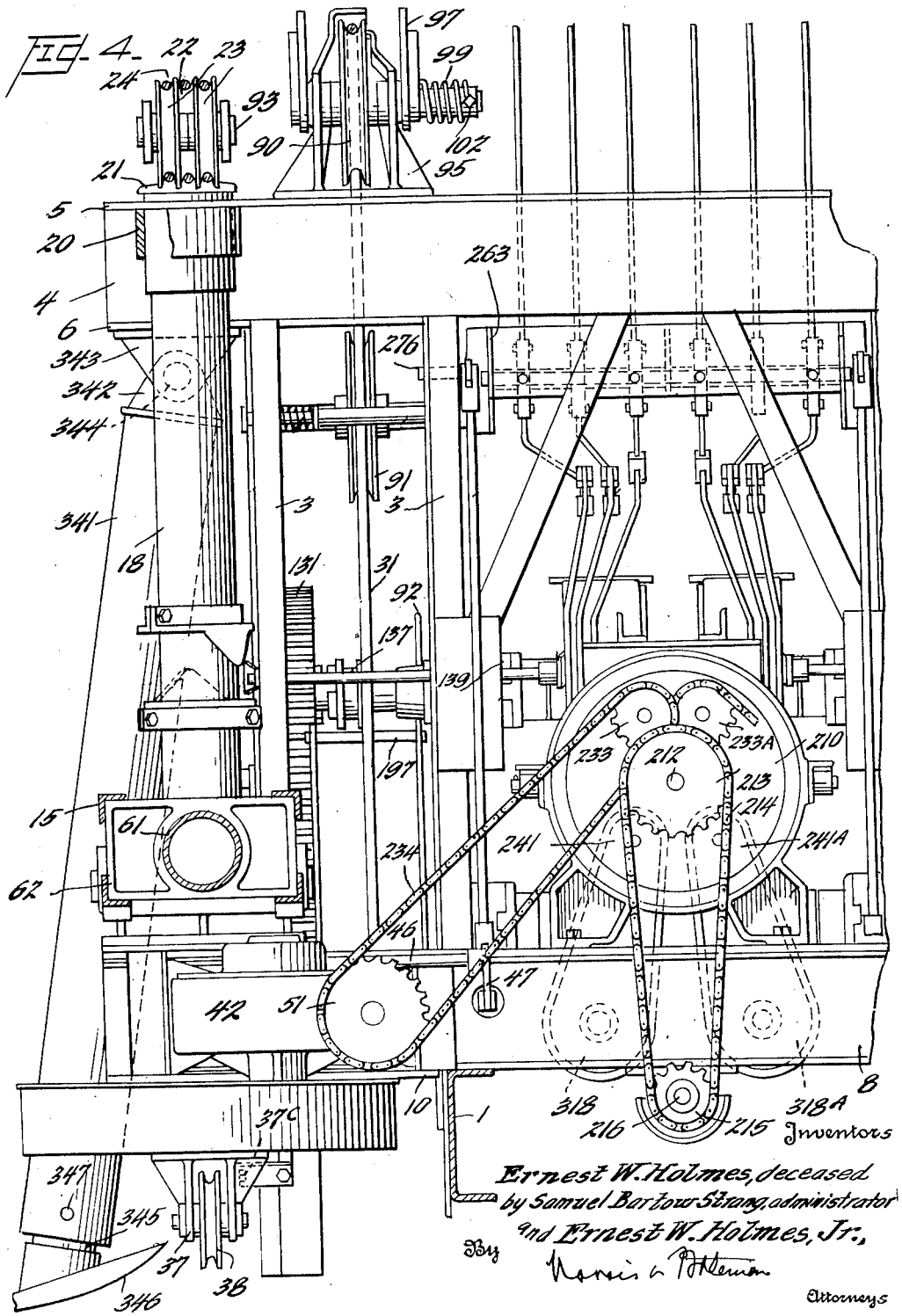

May 5, 1953 E. W. HOLMES ET AL 2,637,448
WRECKER
Original Filed Dec. 28, 1944 6 Sheets-Sheet 5
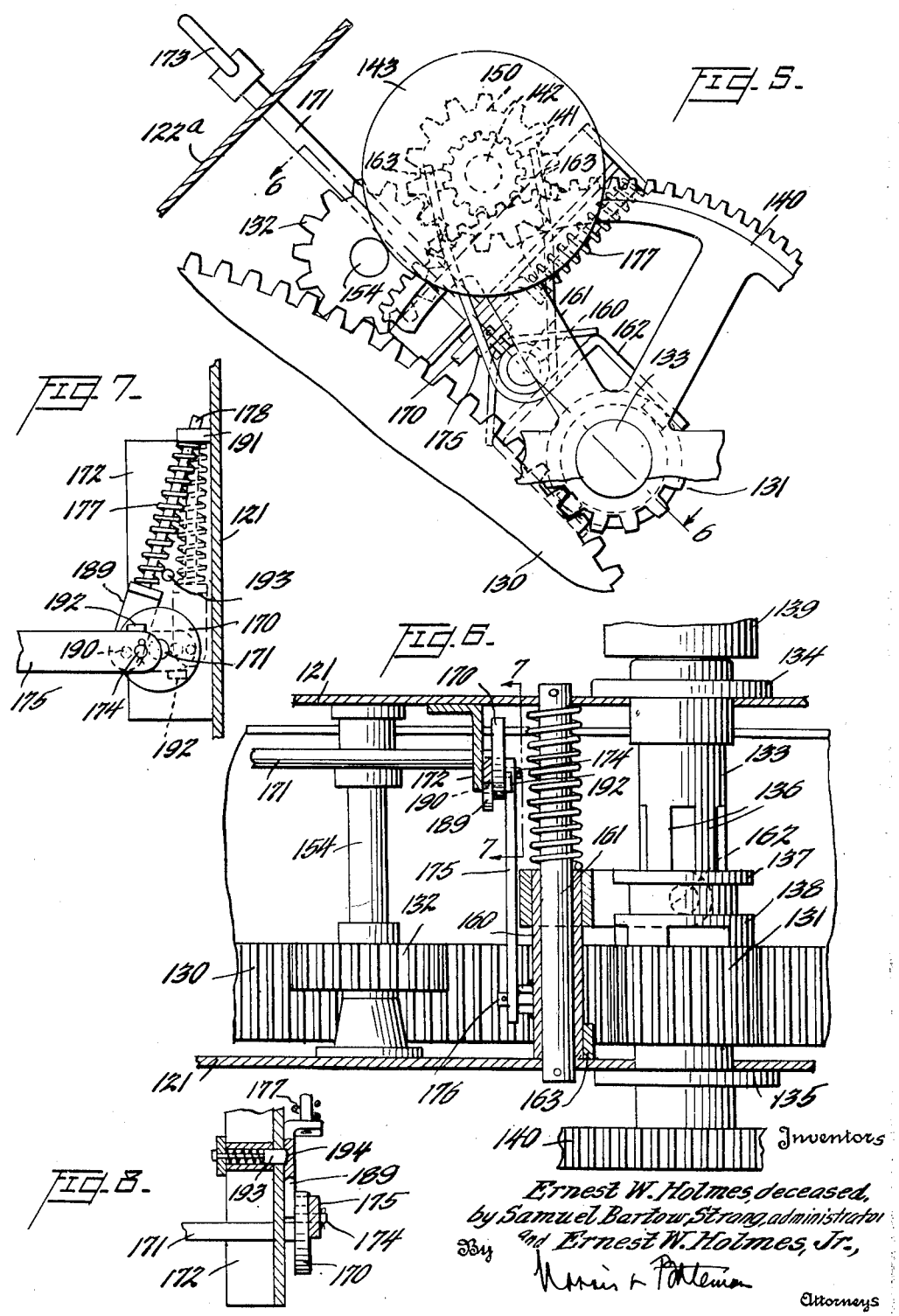
Inventors
Ernest W. Holmes, deceased,
by Samuel Bartow Strong, administrator
and Ernest W. Holmes, Jr.,
By
Attorneys

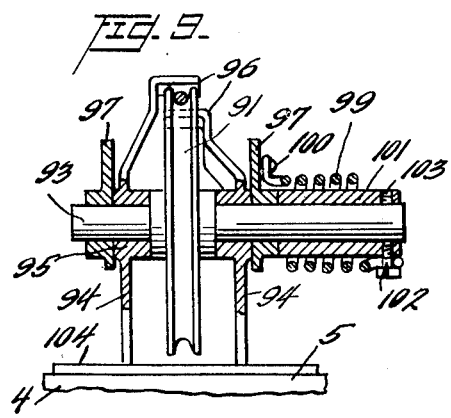
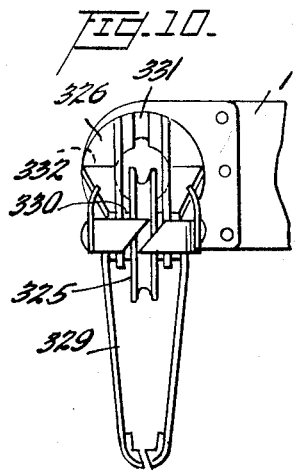
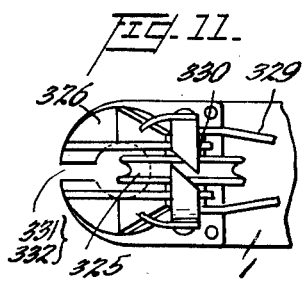
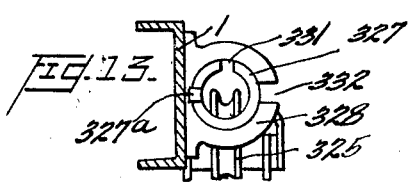
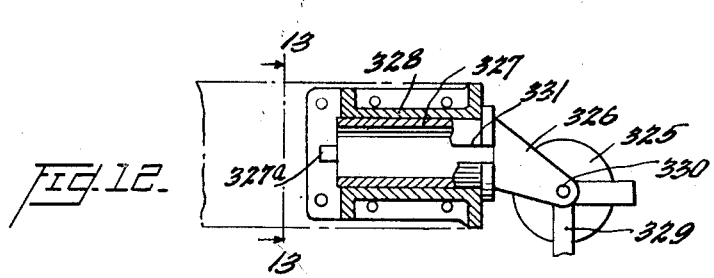

Patented May 5, 1953

2,637,448

UNITED STATES PATENT OFFICE 2,637,448

WRECKER

Ernest W. Holmes, deceased, late of Chattanooga, Tenn., by Samuel Bartow Strang, administrator, Chattanooga, Tenn., and Ernest W. Holmes, Jr., Chattanooga, Tenn., assignors to Ernest Holmes Company a corporation of Tennessee Original application December 28, 1944, Serial No. 570,184, now Patent No. 2,479,009, dated August 16, 1949. Divided and this application June 14, 1949, Serial No. 99,095

3 Claims. (Cl. 212—58)

The present invention relates to improvements in wreckers and similar hoisting apparatus, and more especially to apparatus of the mobile type adapted to be mounted on a truck or other suitable vehicle, and comprising means for handling disabled motor vehicles, and for performing hoisting, pulling, towing and similar operations, this application being a division of prior application Ser. No. 570,184, filed December 28, 1944, now Patent No. 2,479,009, granted August 16, 1949.

One of the primary objects of the invention is to provide a novel and improved wrecker or hoisting apparatus which is capable of performing various operations safely and with speed and facility.

Another object is to provide a guide for yieldingly directing the service cable so that it will be supported above the sheaves and cables which support and raise and lower the boom and thereby avoid fouling of the service cable with said sheaves and boom cable as the boom and cables swing laterally into different angular positions, the service cable guide being capable of yielding upwardly and downwardly to conform with raising and lowering movements of the boom.

Another object is to provide a service cable sheave which is swivelled to swing on a vertical axis so located relatively to the vertical axis of swing of the boom as to maintain a load suspended from the service cable at the end of the boom at the same height at the end of its swing from a position at a side of the wrecker to a position at the rear thereof, and vice versa.

To these and other ends, the invention consists in certain improvements and combinations and arrangements of parts, all as will be hereinafter more fully described, the features of novelty being pointed out more particularly in the claims at the end of this specification.

In the accompanying drawings:

Figure 1 is a side elevation of a wrecker embodying the present invention.

Figure 2 is a rear elevation of the wrecker, showing the booms swung laterally from the respective sides thereof.

Figure 3 is a top plan, partly in section, showing the sheaves for the boom cable and the service cable sheave and guide, and the driving means for the winding means for the boom raising and lowering cable and the service cable for the boom at one side of the wrecker.

Figure 4 is a rear elevation of the structure shown in Fig. 3.

Figure 5 is a detail side elevation of the main and overdrive for one of the service cable winding drums.

Figure 6 is a section taken on the line 6—6 in Fig. 5.

Figure 7 is a detail section taken on the line 7—7 in Fig. 6.

Figure 8 is a detail view, in section, of the detent for holding the main and overdrive for the cable winding drum in neutral.

Figure 9 is an elevation, partly in section, of the swivel bracket for one of the service cable sheaves.

Figure 10 is a rear view of one of the service cable sheaves swivelled on the rear of the wrecker, the sheave being shown in its normal position, as when not in use.

Figure 11 is a view of the sheave shown in Fig. 10 but rotated into a position to permit insertion or removal of the service cable.

Figure 12 is a side elevation partly in longitudinal section, of one of the rear service cable sheaves.

Figure 13 is a section on the line 13—13 in Fig. 12.

Figure 14 is a detail sectional view taken vertically through the service cable sheave bracket and adjacent portions of the structure.

The invention as shown in the accompanying drawings is adapted to be mounted on the chassis of an automotive truck of suitable size and provided with an engine for propelling it, and having a power take-off, which may be of any suitable or well known type, for supplying the power to operate the various parts of the wrecker. Since the construction of the truck and its power take-off are well known, it is deemed sufficient to show only the longitudinal frame members 1 of the truck chassis on which the wrecker is mounted and suitably secured.

The wrecker comprises a frame, generally designated 2 composed of pairs of uprights 3 at the respective sides of the frame, the upper ends of these uprights being rigidly connected by a cross member 4 comprising top and bottom plates 5 and 6, the lower ends of the uprights being secured to a supporting structure comprising a channel iron 7 and an I-beam 8 rigidly secured together by top and bottom plates 9 and 10, forming a base for the frame which extends outwardly from the respective sides of the truck chassis.

The wrecker as shown is of the double boom type in which the booms are pivotally mounted at the respective sides of the frame to swing about vertical axes, these booms being equipped with power means for swinging them laterally to different desired angles, means for raising and lowering the outer end of each boom, and a service cable having means for winding and unwinding it to raise and lower the loads and to perform pulling and other operations, as will be hereinafter described. Since both booms and their associated parts are of the same construction, with the exception that they are mounted respectively on the right-hand and left-hand sides of the wrecker, detail illustration and description of one of these booms and its associated parts will suffice for both, the parts on the left-hand side being shown, and corresponding parts on the right-hand side where they appear being designated by the same reference numerals but with the distinguishing suffix "A."

Each boom is supported at its inner end on a cap 16 to which it is pivotally connected for raising and lowering movements by a horizontal pivot pin 17, this cap being fixed to the lower portion of a tubular mast 18 the lower end of which is rotatable on a vertical axis in a bearing on the base of the frame, and the upper end of which is rotatable in a bearing 20 supported by an extension of the plate 5 at the top of the frame. A sheave bracket 21 is fixed to the upper end of the mast to rotate therewith, this bracket carrying sheaves 22 and 23 for the boom supporting cable 24, portions of this cable passing back and forth between the sheaves 23 and sheaves 25 rotatable in a yoke 26 connected to the outer end of the boom by an equalizing sling 27 and sheaves 28 carried by the yoke 26, as shown and described fully in Patent No. 2,405,578, granted August 13, 1946. One end of the boom supporting cable 24 is attached by links 29 to the yoke 26 and the other end of this cable passes around the sheave 22 and then down through the tubular mast to a drum for raising and lowering the boom, as will be hereinafter described. The outer end of the boom carries a sheave 30 around which the service or hoisting cable 31 passes, this cable passing through a guide 32 and usually extending downwardly from the outer end of the boom for hoisting and other operations.

The lower end of the mast carries a gear wheel 35 which is fixed thereto and enclosed in a casing 36, this gear wheel being driven by a pinion 40 power driven by worm gearing housed in a gear casing 42, the worm gearing being driven by a sprocket wheel 51 fixed on the worm shaft thereof and this sprocket being driven by a chain 234 from a sprocket wheel 233 connected to suitable gearing in a transmission 210 the construction and operation of which are described fully in the prior application hereinbefore referred to, the gear wheel 35 serving to swing the boom laterally into different desired angular positions. The transmission 210 is driven by its main shaft 212 through a sprocket wheel 213 fixed thereto and engaged by a chain 214, the latter engaging a sprocket wheel 215 on a shaft 216 which is connected to the power take-off. A bracket 37 having a guide sheave 38 mounted therein is provided at the lower end of the mast and is held from rotation when the mast is swung about its vertical axis by a bracket 37c which is fixed to the frame of the wrecker. The boom cable 24 below the lower end of the mast passes around the sheave 38 and extends to the drum 39 onto and from which it is adapted to be wound and unwound by worm gearing 310 driven from the transmission 210 by a sprocket wheel 318 connected by a chain to a sprocket wheel 241 of the transmission, as fully described in the prior application hereinbefore referred to. Each boom is composed of telescopic sections 60 and 61 for lengthening and shortening the boom, the section 60 carrying the pivot pin 17 and the inner section 61 carrying the service cable sheave 30. A cable attached to the inner section and provided with an eye 68 for pulling it serves to extend the inner section, and a pin 69 is provided for insertion in holes in the two sections for locking them in different extended relations. Pulling of the cable attached to the inner section of the boom to extend the boom and return of the boom to its normal length are preferably effected by unreeving the service cable 31 from its sheave 30 and guide 32 and attaching its hook to the eye 68, and then operating the service cable by its winding and unwinding means hereinafter described. By this arrangement, extension of the boom section 61 to lengthen the boom serves to automatically swing the boom upwardly, since the boom cable 24 acts as a radial tie of fixed length between the upper end of the boom section 61 and the top of the mast, and as the length of the boom is increased, the upper end of the boom is compelled to rise.

Each service cable 31 extends down around a sheave 90 past an idler sheave 91 to a service drum 92. The sheave 90 is swivelled on the top of the cross member 4 of the frame, by a bracket 95 having a downwardly extending cylindrical portion 105 rotatable in a bearing 106 in the top cross member 4 of the frame, the portion 105 being hollow for the passage of the service cable. This sheave is provided with a cable guide 97 which is movable vertically and supports the service cable so that it will not foul the adjacent boom cable sheaves 22 and 23 as the service cable swings above said sheaves incident to the swing of the respective boom to and from a lateral position relatively to the wrecker but is yieldable downwardly under the tension of the service cable when the latter is attached to the eye 68 and employed for lengthening or shortening the boom. This cable guide 97 comprises a yoke having a pair of arms which straddle the flanges 94 of the bracket 95 and are mounted rotatably on the shaft 93 of the sheave 90, the outer end of the yoke having lugs thereon which are located at opposite sides of the cable 31 and overlie it to thereby retain the cable in engagement with the guide, but having a diagonal opening between them through which the cable may be passed to engage and disengage it with respect to the guide. This guide and the portion of the service cable resting thereon are yieldingly supported in elevated position by a coil spring 99 one end of which is connected to one of the guide arms 97 and the other end of which is fixed to the shaft 93 by a screw 102.

The cable guide 97 serves to guide the service cable as it passes onto the sheave 90 and causes it to swing this sheave to different angles according to the angular positions into which the respective boom may swing about its vertical axis. The vertical axis of the sheave bracket 95 is preferably located opposite to the apex of the angle through which the respective boom swings laterally from one extreme position to the other, and in a vertical plane which substantially bisects said angle, in order that a load suspended by the service cable from the outer end of the boom will be at the same height at the end of the swing as it was at the commencement of the swing, as the boom swings from a position at the side to a position at the rear of the wrecker, or vice versa.

Each service cable is adapted to be wound upon and unwound from the drum 92 to perform the hoisting, pulling and other operations, this drum being mounted rotatably on a sleeve or hollow shaft 120 which spans the space between and is secured to a pair of plates 121 fixed to the uprights 3 of the frame and to the truck chassis, casing sections 122 and 123 being provided above and below the drum. The shaft 126 for the boom cable drum 39 extends rotatably through the sleeve 120 and is fixed to the drum 39 by a plate 125 which is fixed thereto, the shaft 126 being driven by the respective worm gearing through a coupling 128.

Each service cable drum 92 is driven through a gear 130 which is formed integrally with or attached to one of its flanges, and by a main driving pinion 131 which meshes constantly therewith. The pinion 131 is mounted rotatably on a shaft 133 journaled in bearings 134 and 135 in the respective pair of plates 121, this shaft being provided with splines 136 on which a clutch collar 137 is slidable, this clutch collar being thereby driven from said shaft and having clutch jaws 138 thereon which are engageable with or disengageable from complemental jaws on the adjacent side of the pinion 131 whereby the latter may be coupled to and uncoupled from the shaft 133. The shaft 133 is provided at one end with a coupling 139 for connecting it to its power operating means in the transmission 210, as fully shown and described in the prior application hereinbefore referred to. A relatively large gear wheel 140 is fixed to the other end of the shaft 133, and this gear wheel meshes with a relatively small pinion 141 mounted on a shaft 142 whereby the latter may be driven from the shaft 133. A friction drive comprising a friction drum 143 is preferably interposed between the pinion 141 and its shaft 142. The shaft 142 has a gear 150 mounted rotatably thereon and adapted to be coupled thereto by a clutch collar 151 which is splined on the shaft 142, and this clutch collar has clutch jaws thereon which are engageable with and disengageable from complemental clutch jaws on the adjacent face of the gear 150. A gear 152 mounted on a shaft 154 is interposed between the gear 150 and the drum gear 130 so that the main pinion 131 and also the higher speed pinion 152 will both drive the drum in the same direction for a given direction of rotation of the main drive shaft 133.

Each main pinion 131 and overdrive gear 150 are selectively rendered operative to drive the respective service drum under the manual control of a clutch shifter slide 160 which is slidable on a rail 161, this slide being provided at one end with a shifter fork 162 which engages the clutch collar 137 and at the other end with a shifter fork 163 which engages the clutch collar 151. These shifter forks are so arranged that when the fork 162 shifts the collar 137 into engagement with the main pinion 131 to drive the drum from the main pinion, the fork 163 disengages the clutch collar 151 from the gear 150, and when the fork 163 shifts the collar 151 into engagement with the gear 150, for overdrive of the drum, the fork 162 disengages the collar from the pinion 131. When the forks are brought into their midpositions, both clutch collars will be in disengaged positions, the drive for the service cable drum being then in neutral.

The clutch shifter slide 160 is reciprocated by a crank disk 170 fixed on a shaft 171 mounted rotatably in an angle iron 172 and provided with an exterior handle 173 by means of which it may be rotated. The crank disk 170 carries a crank pin 174 which engages one end of a link 175 the other end of which engages a pin 176 fixed to the slide 160. (Figs. 6, 7 and 8.) When the crank disk is rotated into the full line position shown in Fig. 7, the clutch collar 137 will be engaged with the main drive pinion 131, and when the crank disk is rotated through a half revolution to the dotted position shown in Fig. 7, the clutch collar 151 will be engaged with the gear 150. A compressed coil spring 177 biasses the disk 170 toward and yieldingly holds it in one or the other of such clutch engaging positions, this spring encircling a rod 178 carried by a link 189 pivotally connected to the crank disk by a pin 190, and the rod 178 being slidably guided by a lug 191, overthrow of the crank disk under the action of the spring being prevented by a lug 192 fixed to the disk and which abuts against the upper or lower side of the link 175. A spring pressed plunger 193 is arranged to engage in a recess 194 in the link 189 and thereby yieldingly hold the clutch shifter slide in its neutral or midposition.

The driving means thus provided for each service cable drum enables the respective service cable to be wound or unwound rapidly through the high speed or overdrive, whenever desired, as when taking up slack or lifting or pulling relatively light loads by the service cable, and to be wound with greater power, as while lifting or pulling relatively heavy loads. When the drive for this drum is placed in neutral, both drives will be unclutched therefrom, and any desired length of the service cable can then be pulled manually from its drum. The main drive shaft 133 for each service cable drum is driven by power through a coupling 139 connected to worm gearing 285, the latter being driven from gearing in the main transmission 210 as fully shown and described in the prior application hereinbefore referred to.

The invention enables objects to be pulled from an end of either side of the wrecker by either of the service cables independently of the booms, such means comprising a pair of swivelled sheaves 325 mounted on the rear end of the truck chassis, one at each side of the center thereof. Each of these sheaves is journaled in a bracket 326 having a cylindrical portion 327 which is swivelled in a similarly-shaped socket 328 which is bolted or otherwise securely fixed to the end of the truck chassis. The sheave bracket carries a cable guide 329 which is pivoted on the sheave shaft 330, and the sheave bracket has a slot 331 which is brought into register with a slot 332 in the socket when the cable guide is swung inwardly into a substantially horizontal position, as shown in Fig. 11, so that the respective service cable 31, after being unreeved from its boom and idlers 90 and 91, may be extended directly rearwardly from its winding drum 92 and inserted through these registering slots, and passed around the sheave 325. When the sheave bracket 326 is rotated out of such position by swinging the cable guide downwardly about the axis of the swivel, the slots are out of register and the cable will then be retained in the sheave bracket. The service cable may then be employed for pulling directly from the rear of the wrecker, or from either side thereof. Similar swivelled sheaves may obviously be provided at the front of the truck chassis.

The cylindrical portion 327 of the sheave bracket is preferably retained in the socket 328 by a lug 327a which may be cast on the end of the portion 327 which projects forwardly from the socket, this lug being somewhat narrower than the width of the slot 332 in the socket, so that by rotating the sheave bracket out of its normal working position into a position to bring the lug into alinement with the slot 332, the cylindrical portion 327 of the sheave bracket may be inserted axially into the socket, and when the sheave assumes its normal position the lug will be rotated out of alinement with the slot 332 and will be in a position to abut against the forward end of the socket and thus prevent pulling of the sheave bracket out of the socket until the sheave bracket is again rotated to bring the lug into alinement with said slot, which is not a normal working position of the sheave bracket.

In order to increase the stability of the wrecker, especially while heavy loads are being lifted or pulled at either side, a pair of legs 340 are provided, these legs each comprising an upper tubular section 341 having a head fixed in its upper end and provided with lugs 342, and a bracket having cooperating lugs 343 is securely fixed to the under side of the respective end of the top cross member 4 of the frame, the lugs on the leg and on the attaching bracket being pivotally connected by a pin 344 which enables the leg to normally occupy a position close to the respective side of the wrecker, and to be swung outwardly therefrom to a desired position to engage the ground and thereby act as a strut or brace. The tubular upper section of the leg has a lower section 345 which telescopes therein when the leg is not in use, and which may be extended downwardly therefrom into engagement with the ground, this section having a foot 346 on its lower end to provide a firm support on the ground. The length of the leg is adjusted according to the angle into which it is swung outwardly and the distance to the ground, and is locked at such length by a pin 347 which is inserted through holes in the lower portion of the upper section, and through the appropriate one of a series of holes 348 spaced longitudinally in the lower section of the leg.

We claim:

1. Hoisting apparatus comprising a frame, a mast mounted in the frame, a boom mounted on the mast, means including a sheave on the top of the mast and a cable cooperative therewith for raising and lowering the boom, a service cable extending over the upper end of the frame to the outer end of the boom, an idler sheave for the service cable, mounted on the upper end of the frame, a sheave bracket carrying said idler sheave and having a guide pivoted to swing on a substantially horizontal axis and which is controlled by the service cable, said bracket being mounted to rotate on a vertical axis, and means for supporting said guide in an elevated position to swing over the sheave on the top of the mast, but yieldable to permit downward swing of said guide under the tension of the service cable.

2. Hoisting apparatus comprising a frame, a boom mounted on the frame to swing laterally into different angular positions, sheaves at the upper end of the frame and a cable cooperating therewith and connected to the outer end of the boom for supporting and raising and lowering the boom, a service cable extending from the upper end of the frame to the outer end of the boom, a sheave over which the service cable passes, a sheave bracket carrying said sheave and mounted on the upper end of the frame to rotate on a vertical axis adjacent to but offset relatively to the axis of lateral swing of the boom, a service cable guide pivoted on said bracket to swing on a substantially horizontal axis and controlled by the service cable, and means for supporting said guide in an elevated position to support the service cable above the boom supporting sheaves and cable as the boom swings laterally but yieldable to permit downward swing of said guide under tension of the service cable.

3. A wrecker comprising a frame adapted to be mounted on the chassis of a truck, a boom mounted on the frame to swing on a vertical axis through an angle between a position at the rear of the wrecker and a position at a side thereof, a sheave bracket mounted on the upper end of the frame to rotate on a vertical axis located adjacent to but offset from the axis of swing of the boom and opposite to the apex of said angle of swing of the boom and in a vertical plane which substantially bisects said angle, a sheave carried by said bracket, and a service cable reeved over said sheave and extending to the outer end of the boom.

S. BARTOW STRANG,
*Administrator of the estate of Ernest W. Holmes, deceased.*

ERNEST W. HOLMES, Jr.

References Cited in the file of this patent

UNITED STATES PATENTS

| Number | Name | Date |
|--------|------|------|
| 939,937 | Winans | Nov. 9, 1909 |
| 1,254,804 | Holmes | Jan. 29, 1918 |
| 1,300,649 | Raymond | Apr. 15, 1919 |
| 1,325,548 | Wiley | Dec. 23, 1919 |
| 1,590,562 | Blonigen | June 29, 1926 |
| 1,721,546 | Cummings et al. | July 23, 1929 |
| 1,917,053 | Nelson et al. | July 4, 1933 |
| 2,178,280 | Hutchins et al. | Oct. 31, 1939 |
| 2,321,549 | Holmes | June 8, 1943 |
| 2,343,894 | Fisher | Mar. 14, 1944 |